(12) United States Patent
Anderson et al.

(10) Patent No.: US 9,183,172 B1
(45) Date of Patent: Nov. 10, 2015

(54) AUTHOR INTERACTIONS USING ONLINE SOCIAL NETWORKS

(75) Inventors: Emily Margaret Anderson, Seattle, WA (US); Kevin M. Anderson, Edmonds, WA (US); Tom Killalea, Seattle, WA (US); Daniel Leng, Seattle, WA (US); Peter A. Larsen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 710 days.

(21) Appl. No.: 13/166,661

(22) Filed: Jun. 22, 2011

(51) Int. Cl.
*G06F 15/02* (2006.01)
*H04N 21/41* (2011.01)
*G06Q 50/00* (2012.01)
*G06F 3/0483* (2013.01)

(52) U.S. Cl.
CPC .......... *G06F 15/0291* (2013.01); *G06F 3/0483* (2013.01)

(58) Field of Classification Search
CPC . G06F 15/2091; H04N 21/4126; G06Q 50/01
USPC .................................. 709/206, 217
See application file for complete search history.

(56) References Cited

U.S. PATENT DOCUMENTS

| | | | |
|---|---|---|---|
| 7,921,156 B1* | 4/2011 | Stolorz et al. ................. | 709/203 |
| 8,121,902 B1* | 2/2012 | Desjardins et al. .......... | 705/26.1 |
| 8,224,756 B2* | 7/2012 | Roberts et al. ................ | 705/319 |
| 8,326,684 B1* | 12/2012 | Halahmi et al. .............. | 705/14.4 |
| 2008/0077574 A1* | 3/2008 | Gross ................................. | 707/5 |
| 2009/0049127 A1* | 2/2009 | Juan et al. ...................... | 709/204 |
| 2010/0049852 A1* | 2/2010 | Whitnah et al. .............. | 709/226 |
| 2010/0241968 A1* | 9/2010 | Tarara et al. .................. | 715/751 |
| 2011/0161413 A1* | 6/2011 | Cierniak et al. .............. | 709/203 |
| 2011/0196935 A1* | 8/2011 | Rideout et al. ................ | 709/206 |
| 2011/0197146 A1* | 8/2011 | Goto et al. .................... | 715/753 |
| 2012/0096087 A1* | 4/2012 | Curcelli ......................... | 709/204 |
| 2012/0173345 A1* | 7/2012 | Yanefski et al. ........... | 705/14.73 |
| 2012/0278428 A1* | 11/2012 | Harrison et al. .............. | 709/217 |

OTHER PUBLICATIONS

Jeff Huang et al., "Conversational Tagging in Twitter", Jun. 13-16, 2010, University of Washington, ACM 978-1-4503-0041-4/10/06.*
Haewoon Kwak et al., "What is Twitter, a Social Network or a News Media?", Apr. 26-30, 2010, WWW 2010, ACM 978-1-60558-799-8/10/04.*

* cited by examiner

*Primary Examiner* — Joe Chacko
(74) *Attorney, Agent, or Firm* — Lee & Hayes, PLLC

(57) ABSTRACT

Communications from digital content consumers may be entered on reader devices as social media posts. Rather than specifying a particular recipient, a consumer may enter a reserved keyword, such as @author, as the recipient. Upon submission, this keyword is automatically replaced with the recipient identifier, such as with the user identifier of the actual author of the currently rendered content item.

25 Claims, 10 Drawing Sheets

AUTHOR INTERACTIONS USING ONLINE SOCIAL NETWORKS

BACKGROUND

For many years, information and ideas have been primarily distributed using print media such as books and periodicals. In this environment, opportunities for interacting with authors and other creators have been rare.

With the widespread use of the Internet and other communication technologies, however, content such as books and movies are increasingly consumed on personal electronic devices that have electronic communications capabilities. These capabilities allow various types of enhancements to the traditional content consumption experience, many of which have not been realized or exploited.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes incorporating social network capabilities with digital content consumption experiences to allow consumers to easily communicate with content authors and other creators of digital works. Digital works such as electronic books (eBooks) are distributed to users for rendering on eBook reader devices or other suitable readers. A user may create a social network message or post while reading or consuming such a digital work, and may use a reserved keyword to identify the recipient of the message or post. The reserved keyword indicates that the post is intended for the author of the digital work, without indicating the specific online identity of the author. Before submitting the post to the social network, the message is processed to replace the reserved keyword with the username or social network identifier of the author of the digital work. The post is then directed to social network information feeds associated with the author, even though the user who created the post may not have known the username or network identity of the author.

Social network posts created in this manner may be collected and organized, and facilities may be provided allowing the author to conveniently reply to such posts. Other online features may also be implemented in conjunction with this service, as will be described in more detail below.

Social Messaging Author Redirection

Figure 1:
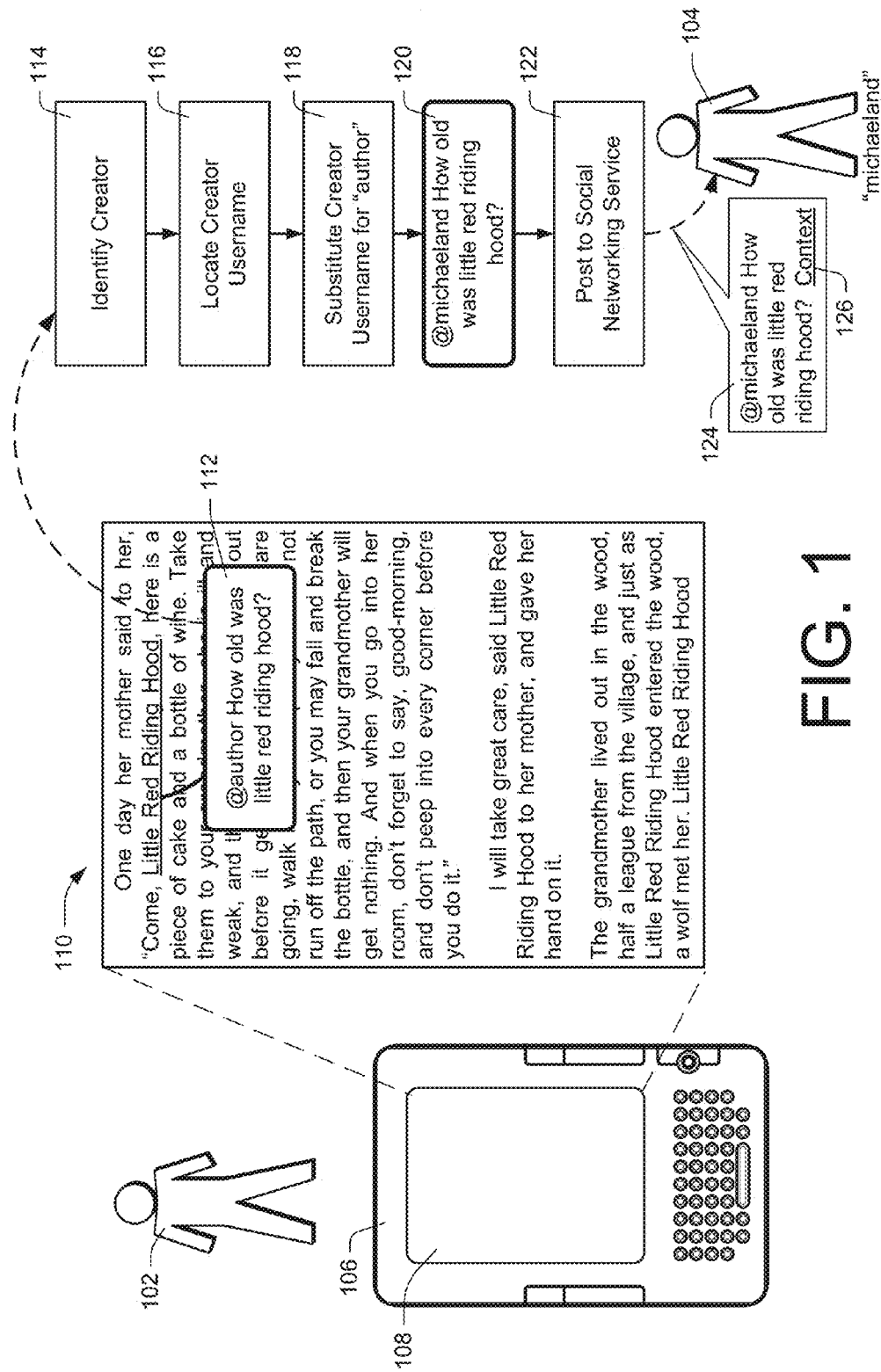
FIG. 1 is shows a personal consumption device that may be used to create posts for distribution via social network services, along with an example of a screen interface and a flow diagram that shows a process of submitting such posts to one or more social network services.

FIG. 1 illustrates an example of how a social messaging post may be entered and submitted to the social network feed of an author 104 while a user is reading a book or other content item created by the author 104. As illustrated, a user 102 has a content consumption device 106, which in the example of FIG. 1 comprises an eBook reader. The eBook reader 106 has a display 108, upon which the text 110 of an eBook or other content item may be displayed. The eBook reader 106 includes user interface features that allow the user 102 to enter a message that is to be submitted to a social network service. In some cases, the user intends the message to be directed to or posted to the feed of a creator (such as an author) of the content item that is currently being displayed. In this example, the user 102, while reading the text 110, has highlighted the phrase "Little Red Riding Hood" and created a message 112 that contains the text "@author How old was little red riding hood?" The "@" or "at" symbol indicates, in conjunction with a particular social network service, that the adjacently following word is the username or identifier associated with a particular individual or entity who is a member of the social network service. In this situation, however, the username "author" is a reserved keyword that more generically indicates one or more creators or authors of whatever eBook is currently being displayed.

When the user submits the message 112, the actions on the right of FIG. 1 are performed. An action 114 comprises, in response to the inclusion of the reserved code or keyword "@author" in the message 112, identifying one or more authors or other creators of the currently displayed eBook. An action 116 comprises locating usernames or network user identifiers of the one or more creators identified in action 114. At an action 118, these usernames or user identifiers are substituted in the message 112 for the reserved keyword "@author." This results in an altered message 120 in which the reserved keyword "@author" has been replaced by the actual username of the author, which in this case is "michaeland." The altered message 120 thus comprises the text "@michaeland How old was little red riding hood?".

An action 122 comprises posting the altered message 120 to the social network service, which may subsequently include the message in various information feeds, and in particular in one or more information feeds associated with the creator or creators of the content that is being presented on the eBook reader 106. The resulting post is shown in FIG. 1 as indicated by reference numeral 124. Note that in addition to modifying the intended recipient of the post, an underlined context link 126 has also been added to the post. This optional context link 126 may be added in some embodiments so that someone reading the social network post may find additional information regarding the post, such as an identification of the book to which it pertains, comments or questions submitted by other users, answers or replies provided by the content creators, and so forth. Examples of how such additional information may be presented will be described in the following discussion.

Example Usage Environment

Figure 2:
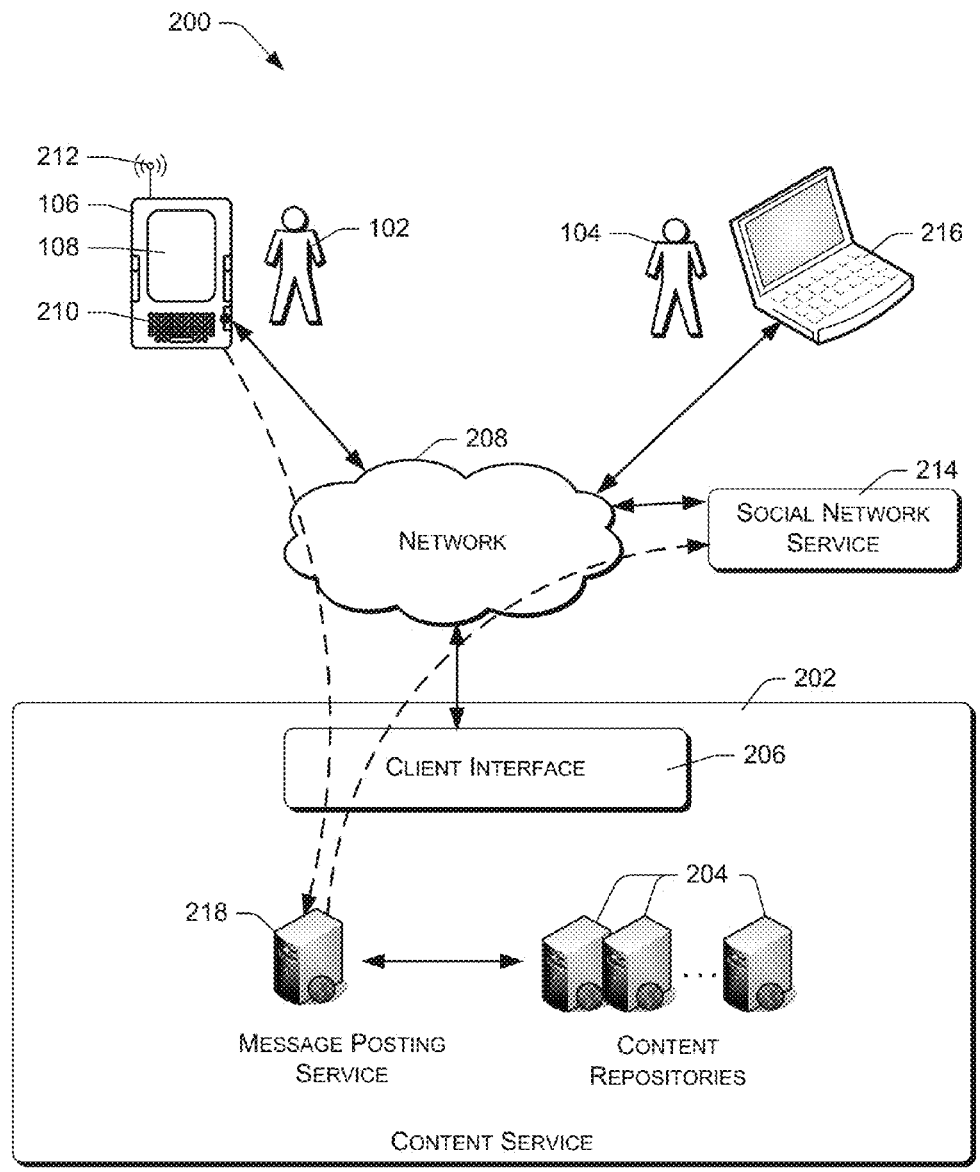
FIG. 2 is a block diagram of an example environment in which the concepts of FIG. 1 may be used.

FIG. 2 shows an illustrative environment 200 in which the techniques of FIG. 1 may be implemented. For discussion purposes, the techniques are described in an online context where content items are retrieved from an online service. However, the concepts described herein are also applicable in other architectures, such as offline environments.

The environment 200 has an online content service 202 from which content items can be purchased or otherwise obtained. The content service 202 may include content repositories or servers 204 that store content items such as eBooks. The terms "electronic document", "electronic book", and/or "eBook", as used herein, include electronic or digital representations of printed works, as well as other digital content that may include text, graphics, audio, video, multimedia, hypertext, and/or hypermedia. Accordingly, the terms "content", "content item", "electronic book", and "eBook" may include any content that is in electronic or digital format.

The content service 202 might be implemented in some embodiments by an online merchant or vendor. Electronic books and other electronic content might be offered for sale by such an online merchant, or might be available to members or subscribers for some type of periodic or one-time fee. In some circumstances, eBooks or other content might be made available without charge.

The content service 202 may have a virtual storefront or other type of online client interface 206 for interaction with consumers and/or devices. The client interface 206 may expose a graphical, web-based user interface that can be accessed by human users to browse and obtain (e.g., purchase, rent, lease, etc.) content items such as eBooks and audio books. The client interface 206 may also expose programmatic interfaces that devices can use to obtain digital content items and to otherwise communicate with components of the content service 202. In the illustrated embodiment, the client interface 206 allows devices to obtain content items from the content repositories 204, and also allows devices to send and receive social messaging posts.

The content service 202 may have wide-area network connectivity, allowing communication between the content service 202 and remote content consumption devices or readers. In the example of FIG. 2, the content service 202 communicates through a public network 208 such as the Internet. Other networks might be used, such as private networks, cellular networks, and other types of networks with wide geographical coverage. In practice, a combination of different types of networks and network technologies may often be involved in communications between the content service 202 and remote consumption devices.

FIG. 2 shows the eBook reader 106 as an example of a remote consumption device. The eBook reader 106 can be a device dedicated to and specifically configured for rendering eBooks. Alternatively, the eBook reader 106 can comprise some other type of electronic device, such as a cellular phone, a personal digital assistant, a personal music player, a tablet computer, a laptop computer, etc., which has been configured to render digital content.

In this example, the eBook reader 106 may comprise a handheld, portable device whose flat-panel display 108 renders eBooks or other content. The display 108 may be implemented with touch-sensitive technology that is responsive to user input registered via, for example, a finger, a stylus, or other similar pointing device. The eBook reader 106 may also include a keyboard 210 or other types of actuatable elements that may have dedicated or assignable operations. For instance, the eBook reader 106 may have a power on/off button, selection keys, joystick, touchpad, and so forth.

The display 108 presents content items such as eBooks in a human-readable format to the user 102. The touch-screen display 108 may depict, for example, text of the eBooks, along with illustrations, tables, or graphic elements that might be contained in the eBooks. In some cases, the eBooks may include multimedia components, such as video or audio. In such scenarios, the display 108 (or an additional display) may also be configured to present video, and the eBook reader 106 may be equipped with audio output components to play audio files.

In the particular embodiment illustrated by FIG. 2, the eBook reader 106 has a wireless communications receiver or transceiver 212, represented in FIG. 2 by an antenna symbol. The wireless communications receiver or transceiver 212 is configured to communicate wirelessly through the network 208 with the client interface 206 of the content service 202. The wireless communications receiver or transceiver 212 can be a wireless local-area or wide-area network receiver, transceiver, or port, configured to communicate through a local-area or wide-area network using conventional IP (Internet Protocol) and IP-related protocols for wireless network communications. Alternatively, the wireless communications receiver or transceiver 212 might be a cellular-based communications component or device such as used in mobile telephones or other personal communications devices. Various different types of technologies might alternatively be used for communications with the content service 202. The communications capabilities of the eBook reader 106 can be used to interact with the content service 202, for example to download content from the content service 202. The communications capabilities may also be used to submit information to the content service 202 as will be described below.

In addition to the content service 202, user devices such as the eBook reader 106 may have access to many other services and sources by way of the network 208. Such services and sources may include one or more social network services 214. Users may post information to the social network service 214, and the posted information may then become available to other users of the social network service 214. Posted information is often presented in different information feeds or streams containing information relating to certain users and/or topics. Different information feeds may present information such as the following:

Posts by the user or by any specified user;
Posts by friends of the user, or by one or more people who have been specified by the user;
Posts containing specified keywords or tags; or
Posts directed to or from the user or another person.

Different types of information feeds may be filtered in these ways and in other ways, and may also be filtered based on user-supplied criteria or preferences. Individual posts may be public and available to any other user, or may be private and accessible only to those designated by the user making the posts. Some posts may be available only to specific recipients.

The information contained within an individual post may vary from one service to another. Some services may allow a wide variety of information to be posted, including links, pictures, videos, songs, and other types of information and media. Other services may be more restrictive. Some may permit only text-based posts. Some services limit posts to text that does not exceed a certain number of characters, such as 140 characters.

An individual post may be directed to a particular person, to a group of people, or to the public in general. The filtering mentioned above may in some cases be based on the designated recipient of a message.

Information posts can be created in different ways, depending on the service. In some cases, a user may interact with a web page or other interface that is relatively rich in functionality. Such a user interface may assist in attaching documents or other media to the post, and may also assist the user in selecting recipients for the post, such as from an address book or some other list of the user's contacts. In other cases, user interfaces may be relatively less sophisticated, and may require the user to type in addresses or codes to specify certain information, including recipients.

As an example, in one popular text-based social network service a user may designate a recipient in the text of the message itself by including the unique username of the recipient, immediately preceded by a special character such as the "@" or "at" character. Thus, a user might compose a text-based post that includes the string "@samanthaj3045," indicating that the post is intended for a user whose username is "samanthaj3045." Note that even though such a post designates a specific recipient, the post may nevertheless be publically available and viewable by people other than the designated recipient.

Individual posts may also be tagged, or may contain tags. Tags may be specially delineated words that indicate the topics of posts. In certain social network services mentioned above, words that adjacently follow the "#" or "hash" character are considered tags, and posts may be located or filtered based on such tags.

FIG. 2 also shows a computer or terminal 216 that can be used to interact with the content service 202 and other online services such as the social network service 214. The computer 216 is representative of many different types of computer and computer-like devices having network connectivity, which may be used to access various online services and sources including the content service 202 and the social network service 214. Such devices may include desktop computers, laptop computers, tablet computers, gaming devices, media players, communications devices such as phones and smartphones, and so forth. A user, which in this example is illustrated as the author or creator 104 of a digital work, may utilize the computer 216 to view information feeds from the social network service 214, to create posts for such information feeds, or for various other purposes. In order to access the social network service 214 and to provide an interface to the author or other user 104, the computer 216 may utilize a software component such as a browser, a communications plug-in, or other client component.

The term "content creator" is used herein to reference a person or entity that has played some role in creating or providing an eBook or other digital content item. Creators of different content items may include authors, editors, translators, illustrators, artists, distributors, producers, actors, providers, retailers, publishers, agents, and so forth. In the following discussion, the terms author, creator, authorship, and creatorship will be used interchangeably to describe the various different types of creatorship roles that may be associated with a content item.

Although only a single content consumption device 106 and a single access computer 216 are shown in FIG. 2, it should be understood that these represent a plurality of such devices. Generally, multiple users 102 will consume multiple content items on multiple respective eBook readers or content consumption devices 106, and multiple authors or creators 104 will access various reports, information feeds, and other sources. Accordingly, the content consumption device 106, the user 102, the access computer 216, and the content creator 104 will be referred to herein as either singular or plural, depending on the context; unless otherwise noted, singular use of these terms should be understood to include the plural, and plural use should be understood to include the singular.

Content items, information feeds, and the various other types of information described herein may be accessed and used with various different types of devices other than the devices shown. For example, the functionality of the content consumption device 106 might in many cases be implemented by programs or applications running on general-purpose computing devices such as personal computers, tablet computers, personal digital assistants, smartphones, or other computer-like devices, many of which are capable of installing and executing applications or programs designated or provided by their users. More specifically, the content consumption and social network functionality described herein might be provided by specialized software running on a computer or computing device that is not dedicated to or specially configured for rendering and consuming eBooks.

The content service 202 may implement a message posting service 218 that receives social network posts from multiple users or consumers of content items. More specifically, social network posts created on and sent from the content consumption device 106 may be directed to or intercepted by the message posting service 218, which may perform the actions described with FIG. 1, culminating with delivery of the posts to the social network service 214.

Example Operational Techniques

Figure 3:
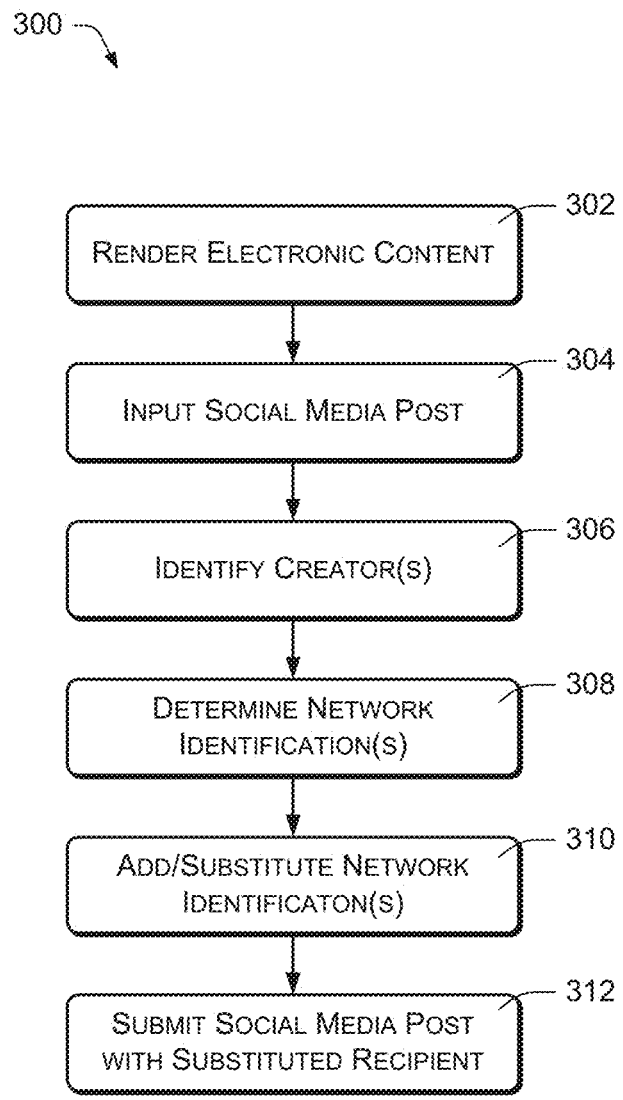
FIG. 3 is a flow diagram showing an example of how social media posts may be created and submitted to authors and other creators of electronic content.

FIG. 3 illustrates elements of a method 300 that can be used in conjunction with an electronic consumption device to communicate with creators of digital content using social media networks.

An action 302 comprises rendering electronic content for consumption by a user. The electronic content may comprise media of various types, including written media, video, audio, and so forth, and may be rendered using any appropriate content consumption device.

An action 304 comprises accepting a social media post that is input by the user of the content consumption device, as the user is interacting with and consuming the electronic content. The social media post may be entered as a text-based message in conjunction with the user interface of the content consumption device, and the message text itself may in some cases designate a recipient designation. In other cases, the recipient may be specified in a field apart from the message text. In either case, the user may specify the social network identification of a person who belongs to the social network.

Alternatively, the user may omit specification of a specific recipient, indicating instead that the social media post is to be directed to the creatorship of the content item that the user is currently consuming. In some cases, the user may specify a particular role of creatorship with respect to the electronic content, such as author, editor, artist, etc. In other cases, the social media post may be directed to multiple creators, to primary creators, or to subsets of creators having default roles such as the first-named author, the lead actor, and so forth.

Different mechanisms may be used to allow the user to indicate that the social media post is to be directed generally to content creators associated with the currently rendered content item, depending on the nature of the social media network to which the social media post will be provided. In some embodiments, in which the recipient is specified within the text of the post itself, the user may designate the author or some other role as the recipient by including a reserved keyword within the text, such as "@creator," "@creators,"

"@author," or "@illustrator." In some cases, multiple such reserved keywords, as well as multiple specifically-identified recipients, may be included in the text. In other embodiments, the social media post may be generated in response to user selection of a particular menu item or command that indicates the user's intent to communicate with the creatorship. For example, a menu command might be available to "Send to Author Feed."

After the user inputs or enters a social media post and indicates that one or more creators are the intended recipients, an action 306 comprises identifying the individuals having the specified role or roles relative to the content item that the user was consuming at the time the social media post was submitted. In some embodiments, this may be performed on the electronic consumption device itself by referring to metadata associated with the content item or by querying other sources, including remote or online sources. In other cases, this information may be provided in response to communication with a remote service or service provider.

An action 308 comprises determining the social network user identification, such as a username, associated with the individual or individual identified by action 306. Again, this may in some cases be performed by the electronic consumption device with reference to metadata associated with the electronic content. Alternatively, the social media post may be provided to a message posting service for this purpose, and the message posting service may determine the network identification of the desired recipients.

An action 310 comprises adding the network user identification of the identified individual or individuals to the social media post, or otherwise associating the network user identification with the social media post. For example, this may involve altering the social media post by replacing the reserved keyword with the actual network identification or username of the identified creator (such as by replacing @author with @michaeland in the example of FIG. 1).

An action 312 comprises submitting or posting the social media post to one or more social media networks, such as to the network feed of the identified creator. Different social media networks may handle submissions such as this in different ways, as explained above. In some embodiments, the action 312 may comprise submitting or posting the social media post to multiple social media networks, and/or to multiple feeds associated with the identified creator.

Figure 4:
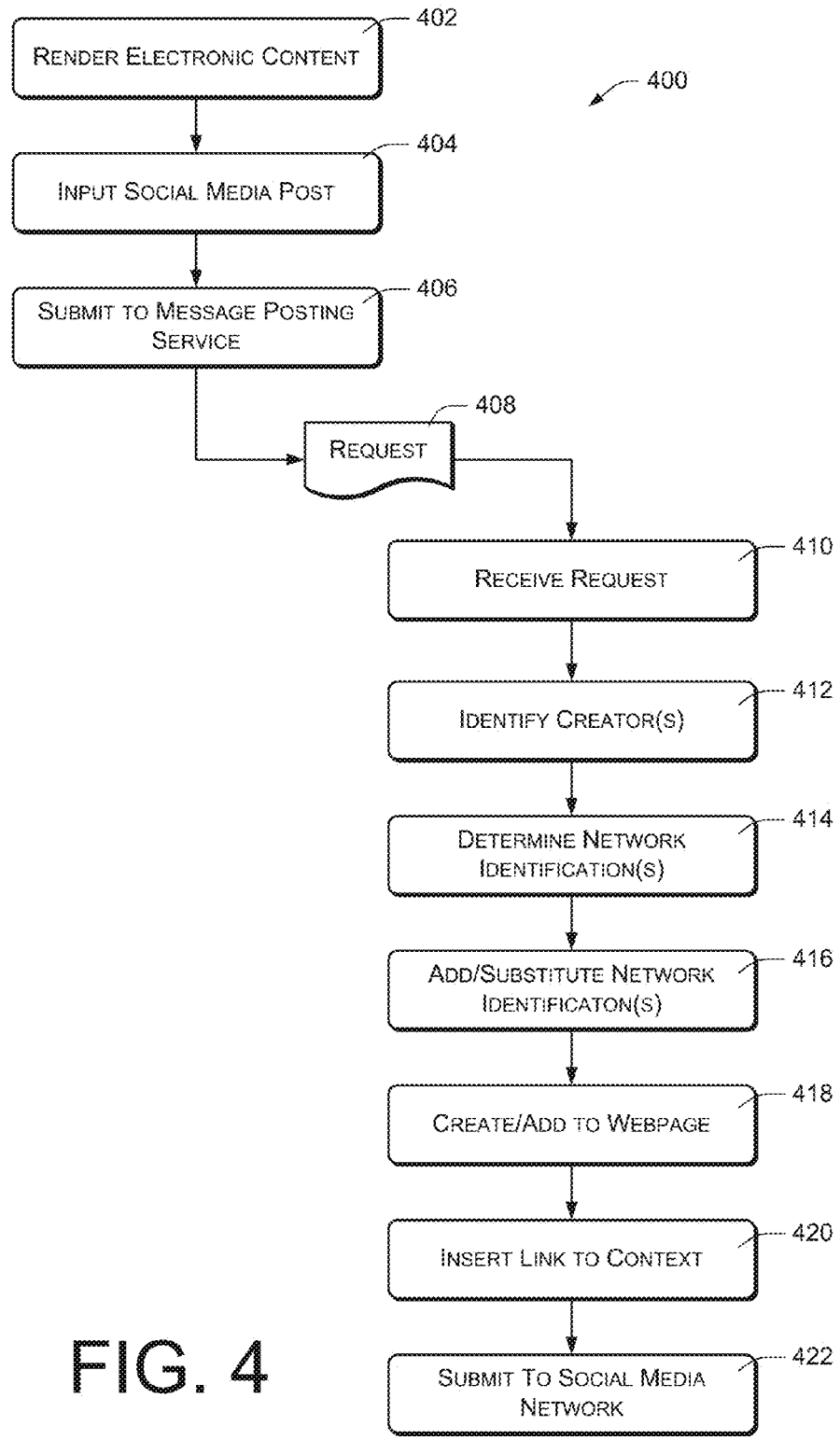
FIG. 4 is a flow diagram showing another example of how social media posts may be created and submitted to authors and other creators of electronic content.

FIG. 4 illustrates an example 400 of techniques that may be used in an embodiment implemented in conjunction with the content service 202 and/or message posting service 218 of FIG. 2. Actions performed by the eBook reader 106 are shown on the left side of FIG. 4; actions performed by the message posting service 218 are shown on the right.

An action 402 comprises rendering electronic content on a consumption device, such as by displaying an eBook. An action 404 comprises accepting a social media post or message that has been input by a user of the consumption device. Such a post or message may be entered by the user in different ways, depending on the intended social media network and on the input capabilities of the consumption device. Furthermore, posts or messages may be associated with particular locations within a content item, such as a location that the user is currently reading or consuming. For example, a post may be associated with a particular word, phrase, sentence, paragraph, scene, chapter, or section. Alternatively a post may be associated more generally with an entire work or content item. In some embodiments, the user may be able to specify which portion of the content item is referred to by the post— such as by highlighting a portion of the content before submitting the post.

An action 406 comprises submitting the social media post to the message posting service 218 as part of a request 408. The request may contain the social media post itself and other data such as an identification of the content item that was being rendered when the post was created, the particular location within the content item at which the post was made or with which it should be associated, an identification of the consumption device and/or the user of the consumption device, and any other information that may be useful to the message posting service 218.

An action 410 comprises receiving the request 408 by the message posting service 218 receives and extracting the information carried by the request. At action 412, the message posting service identifies the creatorship of the content item indicated by the request. This may be accomplished by referencing data known to the content service 202, possibly in conjunction with individual content creators signing up to receive social media posts from the message posting service 218.

An action 414, performed by the message posting service 218, comprises determining one or more social network identifiers, such as a usernames, that are associated with the identified creatorship in conjunction with the intended social network service. This information may be provided by the creators themselves as they sign up to use the services of the message posting service 218. Alternatively, this information may be known by the content service 202 from previous transactions with creators, or from accounts already established with the content service 202 by the content creators.

An action 416, performed by the message posting service 218, comprises adding the social network identifier or identifiers of the creatorship to the social media post, or substitutes them for one or more reserved keywords that the user has specified.

In the embodiment of FIG. 4, various information about submitted social media posts may be collected and aggregated by the message posting service 218, and presented in a convenient format on a web page that is accessible to users and creators over the Internet. This may be particularly useful in conjunction with social networks that limit the sizes of posts. In these cases, it may not be possible to include contextual information in the posts, such as the specific content items to which the posts refer. To direct users and creators to such information, an action 418 may comprise creating a web page for viewing contextual information about posts that have been made through the message posting service 218, or adding a new social media post to web pages that have previously been created.

Contextual web pages such as this may show information about the content items to which posts apply, and may show the posts themselves. Furthermore, such context pages may aggregate and/or summarize social various media posts. Examples will be given below.

An action 420 comprises inserting a link to a context web page or other context source in the social media post that has been created by the user of the content consumption device. An action 422 then comprises submitting the social media post, with the described alterations and/or modifications, to the social network service 214.

Because social media posts created in this manner are known to the content service 202, they may be subsequently included with content items and thereby shared with multiple users. Thus, the action 402 of rendering the electronic content may include rendering previously posted social network posts as part of the electronic content, possibly as annotations associated with particular locations within the electronic content.

Example Context Pages

Figure 5:
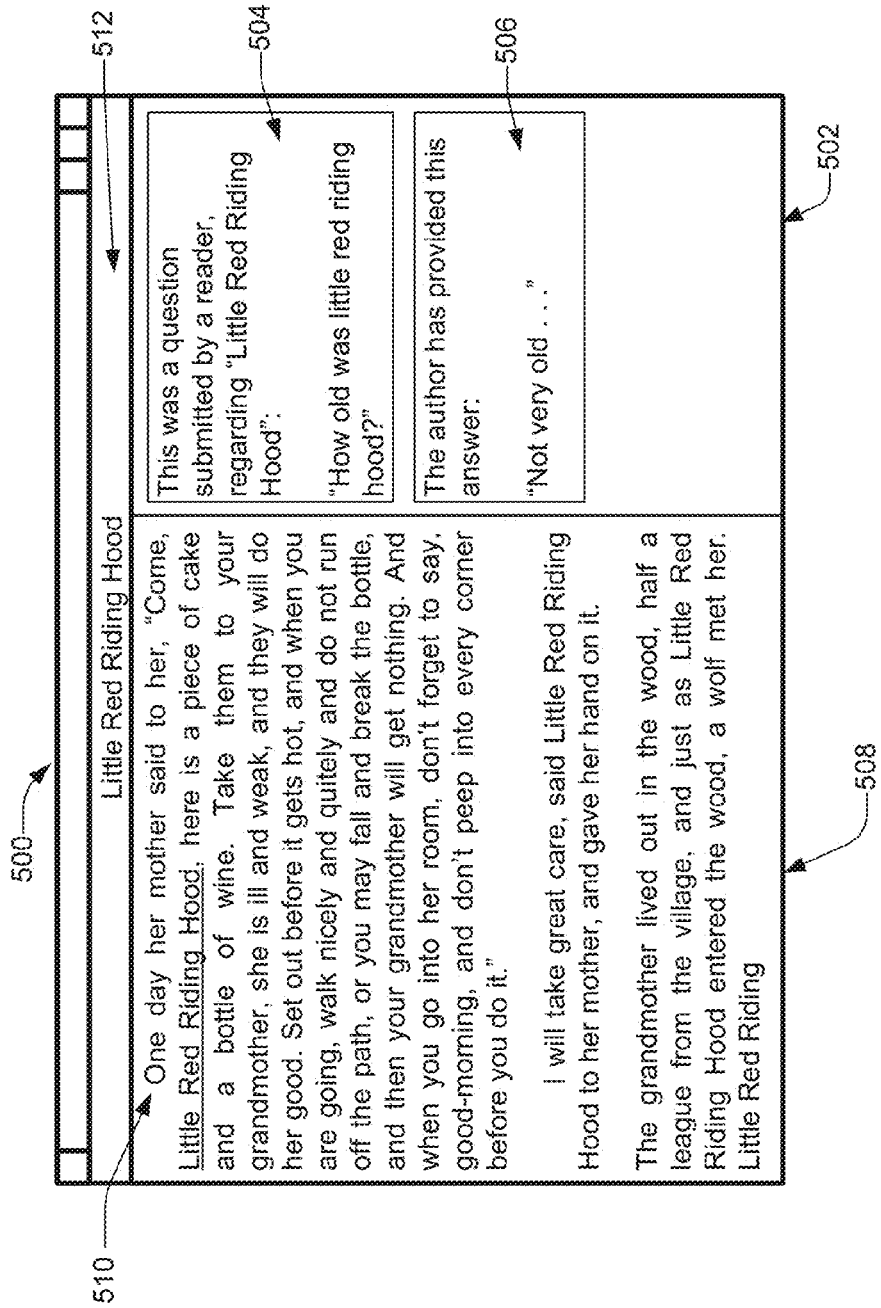
FIGS. 5-7 show examples of user interface displays that may be used to present context information in relation to social messaging posts regarding electronic content items.

FIG. 5 illustrates an example of a context web page 500 in which social media posts and other information may be presented for viewing by users and content creators, or to any other individual who may have received and/or viewed a social media post generated by the methods described above. As described, each of such posts may contain an inserted link, which may direct the individual to such a web page.

In this example, a right-hand question pane 502 contains an upper area 504 containing the text of a social media post. A lower area 506 may also be included, showing any comments, replies, or answers made by the creatorship to which the social media post was directed.

The web page 500 may also contain a left-hand pane 508 that shows original text 510 of the content item to which the post shown in the upper area 504 pertains. If the post pertains to a particular location within the content item, that particular location may be shown and highlighted (indicated by underlining in FIG. 5).

A title block 512 may be used to indicate identifying information regarding the content item, such as the title, author, publication date, and so forth.

Figure 6:
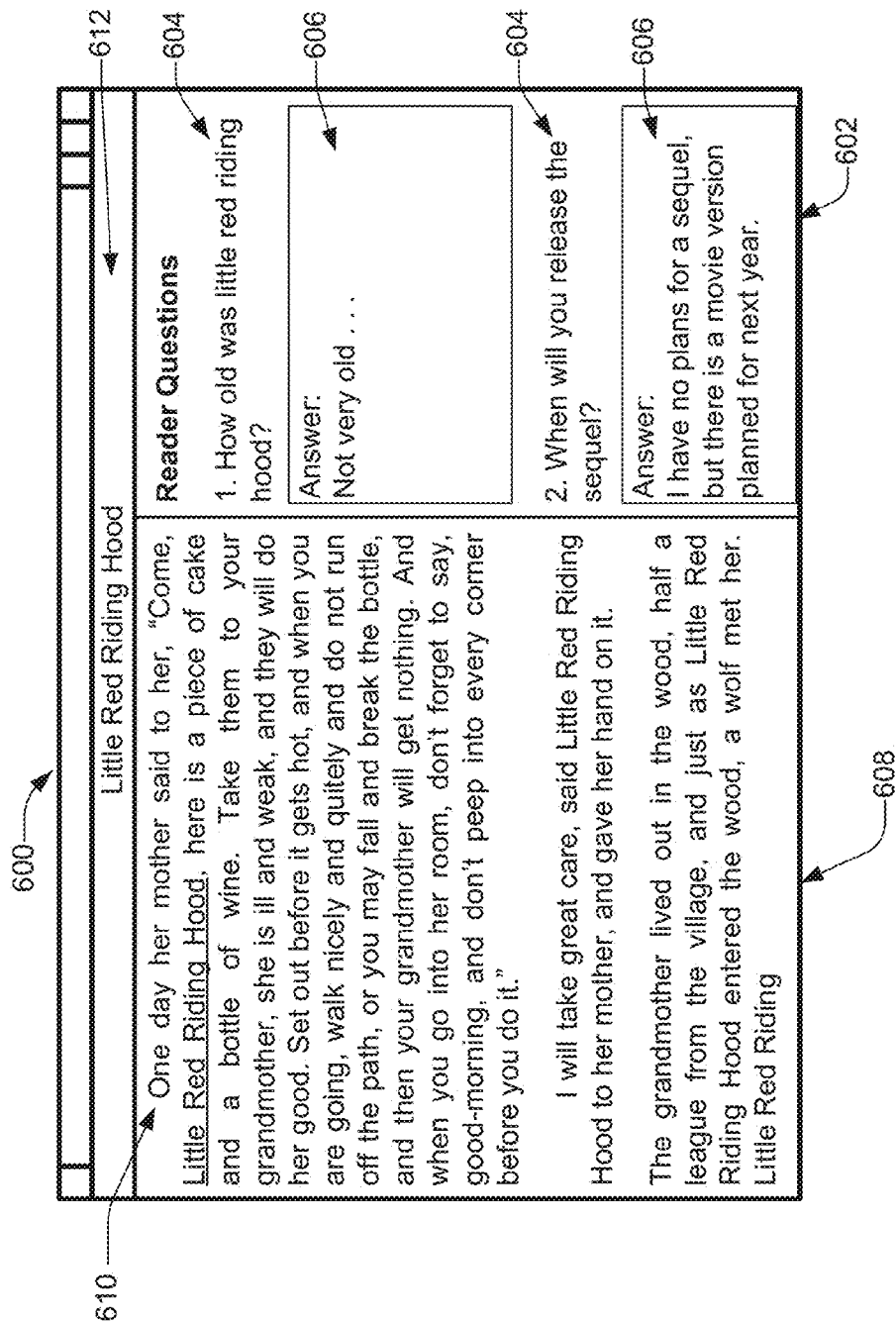

FIG. 6 illustrates another example of a context web page 600, which in this case is intended for viewing by various users and readers of content items. The link inserted by action 420 of FIG. 4 may direct a user to a context web page such as this, which may list questions submitted by various different users and answers provided by the digital item creators. The context web page 600 may include a right-hand pane 602, which contains a scrollable list of questions 604 and answers 606. The context web page 600 may also include a content pane 608, containing the relevant portion of the content item 610 to which each question or comment corresponds. The displayed location may change depending on which question the user is viewing or has highlighted. Note that the link provided within the social network post may automatically position the views so that the question contained within the post is viewable upon selecting the link. A title block 612 may indicate identifying information regarding the content item such as its title and other information.

Figure 7:
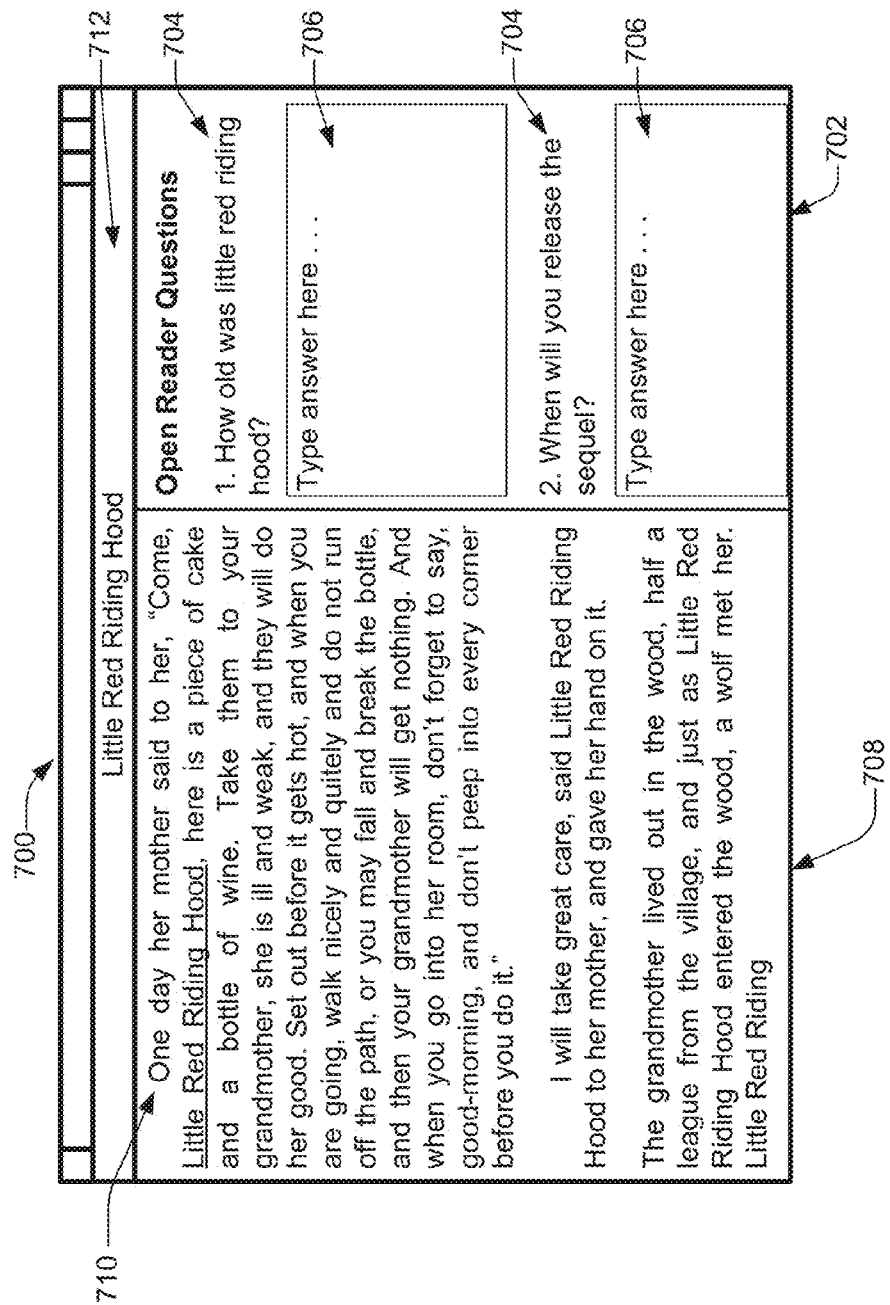

FIG. 7 illustrates an example of a context web page 700 in which social media posts may be summarized for viewing by a creator, and which provides a convenient way for the creator to provide answers or comments to questions submitted by users through the message posting service 218. In this example, a right-hand comment pane 702 contains a list of reader questions that have been submitted to an author using the social network posting functionality described above. The comment pane 702, which may also be referred to as a question pane, lists comments or questions 704 that have been submitted by different users, and which have been directed to the social network feed of a particular content item creator. The list may be filtered in some embodiments to include only those comments or questions that the item creator has not seen or answered, or according to some other criteria. The content creator can scroll up and down through this pane to view different comments, and may enter answers or replies in text entry boxes 706 beneath each question 704.

The web page 700 may also contain a left-hand pane 708 that shows original text 710 of various content items associated with the creator who is viewing the web page 700. In this embodiment, the questions 704 may pertain to different content items associated with the creator, and to different locations within those content items. The content pane 708 responds to selection of a particular question 704 by displaying the content to which the question pertains. In addition, in cases where a question corresponds to a particular location within the content, the content pane 708 shows that particular location, with the relevant part of the content underlined or otherwise highlighted. In this case, it is assumed that the creator has selected the first question 704, which corresponds to the underlined text "Little Red Riding Hood". This provides the context for the question 704, and makes it easy for the creator to provide an answer within the corresponding text entry box 706. In addition, the title of the currently presented content item may be displayed in a title block 712.

Context pages such as those discussed above may be modified, enhanced, and combined in various ways for the convenience of content creators and readers. With regard to content creators, context pages may contain summaries of relevant social media posts, in which similar questions are grouped and/or represented by a single question. Questions regarding particular locations within a content item may similarly be grouped together. Questions may be filtered in various ways, such as to show those from certain senders or regarding certain topics. Questions may furthermore be aggregated across multiple authors or across multiple works of a single creatorship entity. More frequently asked questions may be promoted to the top of question listings, and currently open questions may be viewable by the public in addition to questions to which the author has already responded. Certain questions that have already been answered may be assigned previous answers, without further participation by the author, or human analysts may be employed to aggregate questions and to provide answers from a corpus of previous answers. Another option may be to associate discussion forums with the context web pages, so that readers may conduct discussions regarding topics that have been commented on through the message posting service 218.

The social network posting service may be configured to protect the identity and personal information of both authors and users by omitting specific identifications from posts that are made to social network sites, other than the usernames of the intended recipients. If email notifications are provided, for example, such notifications may be made without revealing email addresses between the various actors.

Monitoring Social Network Feeds

In addition to collecting and presenting social media posts submitted through the message posting service 218, relevant messages may be collected from social media networks even though they have been posted independently of the content service 202 and the message posting service 218. Specifically, social media feeds may be monitored to identify and detect feed items that relate to particular authors or content items. Furthermore, it may be possible in some embodiments to identify replies and comments to posts that are originally made through the message posting service 218. Such replies and comments may then be added to the context pages described above.

Figure 8:
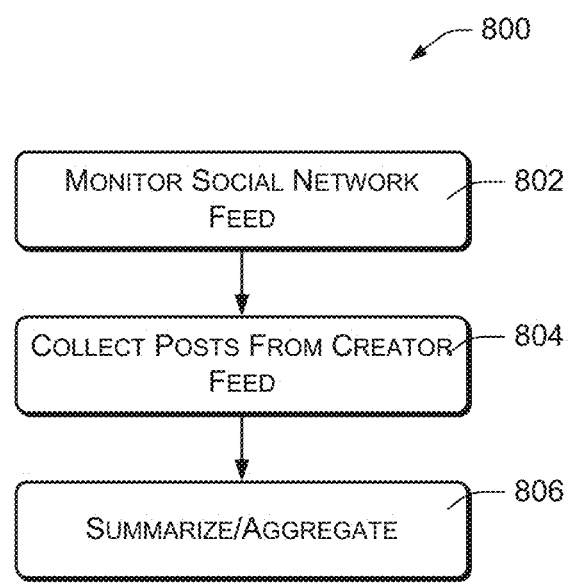
FIG. 8 is a flow diagram showing an example of how a message posting service may gather social media posts for summarized or aggregated display to users and content creators.

FIG. 8 shows an example 800 of gathering social media items for inclusion or association with social network posts that are originally made through the message posting service 218. An action 802 comprises monitoring one or more social network feeds. An action 804 comprises identifying and collecting posts relating to the same subjects, users, or creators as original posts made by way of the message posting service 218. This may be done by searching social network feeds for keywords, or by searching social network messages for those specifying the same subjects, tags, users, or creators as those of original posts made through the message posting service 218.

An action 806 comprises summarizing and/or aggregating the collected posts, such as on context web pages as described above. Thus, authors may provide answers to question submitted through social media posts by replying or responding to the social media posts using the social networks themselves. The method of FIG. 8 may be used to identify such answers, and to include such answers in context pages or other locations for perusal by content consumers.

Example Client and Server Configurations

Figure 9:
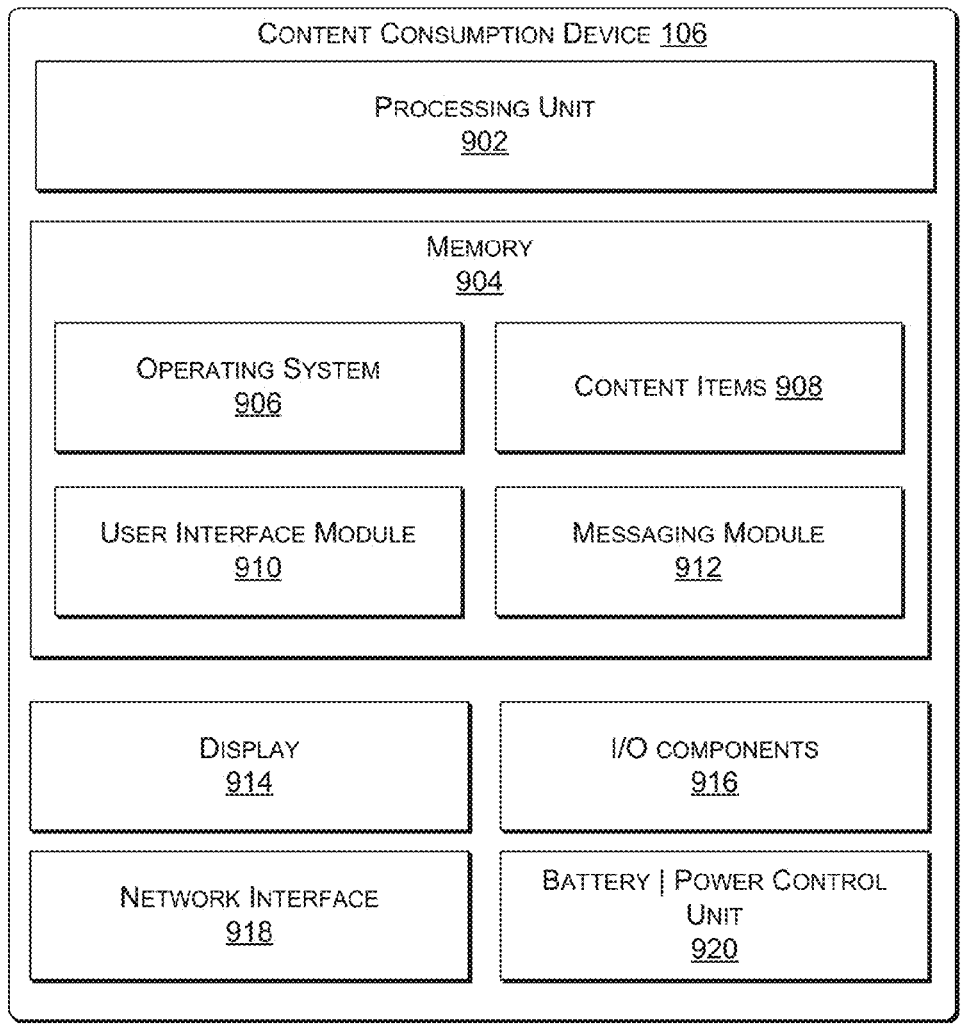
FIG. 9 is a block diagram showing a high-level configuration of an example content consumption device that may be used in conjunction with the techniques described herein.

FIG. 9 illustrates relevant components that might be implemented in the content consumption device 106. In FIG. 9, it is assumed that the content consumption device 106 is a dedicated, handheld eBook reader device equipped with a display to display eBooks. Other embodiments, however, may employ any other type of content consumption device as discussed above.

In a very basic configuration, the content consumption device 106 includes a processing unit 902 composed of one or more processors, and memory 904. Depending on the configuration of the content consumption device 106, the memory 904 may comprise computer storage media and may include volatile and nonvolatile memory. Thus, the memory 904 may include, but is not limited to, RAM, ROM, EEPROM, flash memory, or other memory technology, or any other medium which can be used to store media items or applications and data which can be accessed by the content consumption device 106.

The memory 904 may be used to store any number of functional components and/or operational logic modules that are executable on the processing unit 902, as well as data and media items that are rendered by the content consumption device 106. Thus, the memory 904 may store an operating system 906 and an eBook storage database to store one or more content items 908, such as eBooks and audio books.

A user interface module 910 may also be provided in the memory 904 and executed on the processing unit 902 to provide for user operation of the content consumption device 106.

The user interface module 910 may be associated with a messaging module 912 that is configured as operating logic to perform many of the processes described herein. The messaging module 912 interacts with the user 102 and enables the user to create messages or posts for delivery through the message posting service 218 to one or more social network services.

The content consumption device 106 may further include a display 914 upon which electronic books and other content items are rendered. In one implementation, the display uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The content consumption device 106 may further be equipped with various input/output (I/O) components 916. Such components may include various user interface controls (e.g., buttons, joystick, keyboard, etc.), audio speaker, connection ports, and so forth.

A network interface 918 may support both wired and wireless connection to various networks, such as cellular networks, radio, WiFi networks, short range networks (e.g., Bluetooth), IR, and so forth. The network interface 918 facilitates receiving electronic books and other content as discussed herein. Of particular note, the network interface 918 enables wireless delivery of the content items 908 over a wireless network.

The content consumption device 106 may also include a battery and power control unit 920. The power control unit operatively controls an amount of power, or electrical energy, consumed by the content consumption device 106. Actively controlling the amount of power consumed by the device may achieve more efficient use of electrical energy stored by the battery.

The content consumption device 106 may have additional features or functionality. For example, the content consumption device 106 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Figure 10:
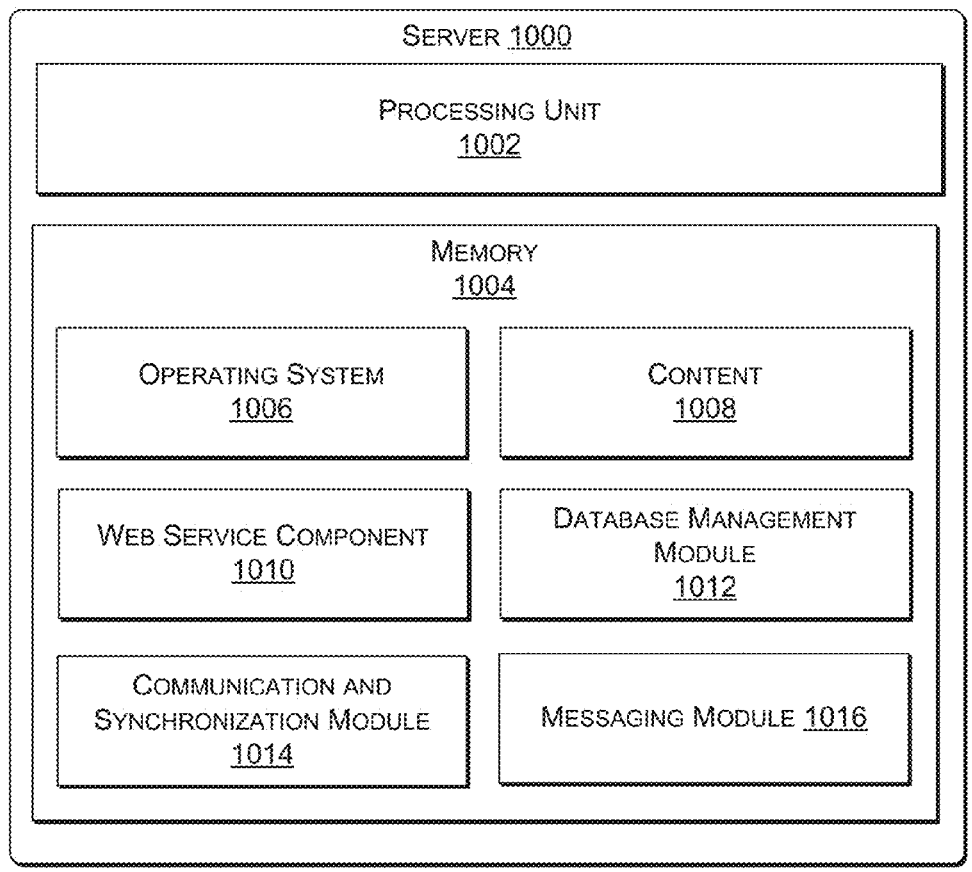
FIG. 10 is a block diagram showing high-level components of a computer server that may be used to provide certain of the functions and services described herein.

FIG. 10 illustrates relevant components of a server 1000 that may be used to implement the functionality of the content service 202 and/or the message posting service 218. Generally, each of the content service 202 and the message posting service 218 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises. For purposes of discussion, the functionality of content service 202 is described as being implemented by the single server 1000.

In a very basic configuration, the example server 1000 might comprise a processing unit 1002 composed one of one or more processors, and memory 1004. The memory 1004 may comprise computer storage media and may include volatile and nonvolatile memory. Thus, the memory 1004 may include, but is not limited to, RAM, ROM, EEPROM, flash memory, or other memory technology, or any other medium which can be used to store media items or applications and data which can be accessed by the server 1000.

The memory 1004 may be used to store any number of functional components that are executable on the processing unit 1002, as well as data and content items that are supplied to consuming devices such as the content consumption device 106. Thus, the memory 1004 may store an operating system 1006 and a content storage database 1008 to store one or more content items such as eBooks.

Functional components of the server 1000 may also comprise a web service component 1010 that interacts with remote devices such as computers and content consumption devices. The client interface 206 may be implemented by the web service component 1010, for example.

The server 1000 may also include various database management components 1012 for keeping track of users, purchases, etc. The server 1000 may also include a communication and synchronization module 1014 to communicate with remote consumption devices, to communicate any purchased electronic content to those devices, and to receive annotations from content consumption devices.

The server 1000 may include a messaging module 1016 that is configured as operating logic to perform the processes described above.

The server 1000 may of course include many other logical, programmatic, and physical components, of which those shown in FIG. 10 are merely examples that are related to the discussion herein.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   under control of one or more processors configured with executable instructions, displaying, on a user device for viewing by a user, a first electronic book comprising electronic or digital representations of a first textual work or a second electronic book comprising electronic or digital representations of a second textual work;
   while displaying the first electronic book or the second electronic book, accepting from the user a social media post having a generic reserved keyword, wherein the generic reserved keyword indicates that the social media post is intended for a creator of the first electronic book when the first electronic book is displayed and that the social media post is intended for a creator of the second electronic book when the second electronic book is displayed;
   identifying the creator of the first electronic book or the creator of the second electronic book in response to the generic reserved keyword in the social media post;
   determining a specific user identifier that is associated with the identified creator by a social media network;
   substituting the specific user identifier for the generic reserved keyword in the social media post; and
   posting the social media post to the social media network using the substituted specific user identifier.

2. The method of claim 1, wherein the social media post comprises message text that contains the specific user identifier.

3. The method of claim 1, further comprising inserting a link to a web page into the social media post, wherein the web page indicates context of the social media post.

4. The method of claim 1, further comprising sending a notification to the identified creator in conjunction with the social media post.

5. The method of claim 1, further comprising aggregating social media posts designating the identified creator on one or more web pages for viewing by the identified creator.

6. The method of claim 1, further comprising summarizing social media posts designating the identified creator on one or more web pages for viewing by the identified creator.

7. The method of claim 1, further comprising sharing the social media post with multiple consumers of the electronic book as annotations accompanying the electronic book.

8. The method of claim 1, wherein the user identifier is used by the social media network to correspond with the identified creator via the social media network.

9. A method comprising:
   receiving a social media post including a generic keyword from a device that is rendering one of a first electronic content item comprising an electronic or digital representation of a first textual work having a first author or a second electronic content item comprising an electronic or digital representation of a second textual work having a second author, wherein:
      the social media post and the generic keyword do not specify the first author or the second author,
      the generic keyword indicates that the social media post is intended for the first author when the device is rendering the first electronic content item, and
      the generic keyword indicates that the social media post is intended for the second author when the device is rendering the second electronic content item;
   identifying an author of the rendered content item as the first author if the rendered content item is the first electronic content item or as the second author if the rendered content item is the second electronic content item;
   determining a user identifier associated with the identified author of the rendered content item; and
   posting the social media post to a social network feed using the user identifier associated with the identified author of the rendered content item.

10. The method of claim 9, wherein the received social media post does not specify a particular recipient of the social media post.

11. The method of claim 9, further comprising specifying the identified author of the rendered content item as the recipient of the social media post.

12. The method of claim 9, further comprising providing a web page indicating context of the social media post, and providing a link to the web page from the social media post.

13. The method of claim 9, further comprising providing a web page that aggregates social media posts relating to the identified author of the rendered content item.

14. The method of claim 9, further comprising providing a web page that summarizes social media posts relating to the identified author of the rendered content item.

15. The method of claim 9, further comprising sharing the social media post with multiple consumers of the rendered content item as annotations accompanying the rendered content item.

16. The method of claim 9, further comprising posting the social media post to multiple social network feeds associated with the identified author of the rendered content item.

17. A method comprising:
under control of one or more hardware processors configured with executable instructions,
accepting a social media post from a user who is consuming an electronic content item comprising a first electronic content item comprising an electronic or digital representation of a first textual work or a second electronic content item comprising an electronic or digital representation of a second textual work, wherein the social media post includes a keyword indicating a creatorship role, the first electronic content item has a first one or more creators, and the second electronic content item has a second one or more creators;
identifying the electronic content item the user is consuming as the first electronic content item or the second electronic content item;
at least in part in response to accepting the social media post including the keyword and identifying the electronic content item the user is consuming, identifying a creator having the creatorship role indicated by the keyword from the first one or more creators when the electronic content item the user is consuming is the first electronic content item and from the second one or more creators when the electronic content item the user is consuming is the second electronic content item;
determining one or more social messaging feeds associated with the identified creator; and
posting the social media post to the one or more social messaging feeds associated with the identified creator.

18. The method of claim 17, further comprising creating a web page indicating context of the social media post, and providing a link from the social media post to the web page.

19. The method of claim 17, further comprising notifying the identified creator in conjunction with posting the social media post.

20. The method of claim 17, further comprising aggregating social media posts for viewing by the identified creator.

21. The method of claim 17, further comprising summarizing social media posts for viewing by the identified creator.

22. The method of claim 17, further comprising automatically responding to the social media post.

23. The method of claim 17, further comprising sharing the social media post with multiple consumers of the electronic content item as annotations accompanying the electronic content item.

24. The method of claim 17, further comprising posting the social media post to multiple messaging feeds associated with the identified creator.

25. The method of claim 17, wherein the creatorship role comprises one or more of the following:
author;
editor;
translator;
illustrator;
artist;
distributor;
provider;
retailer;
publisher; or
agent.

* * * * *